Figure 1:
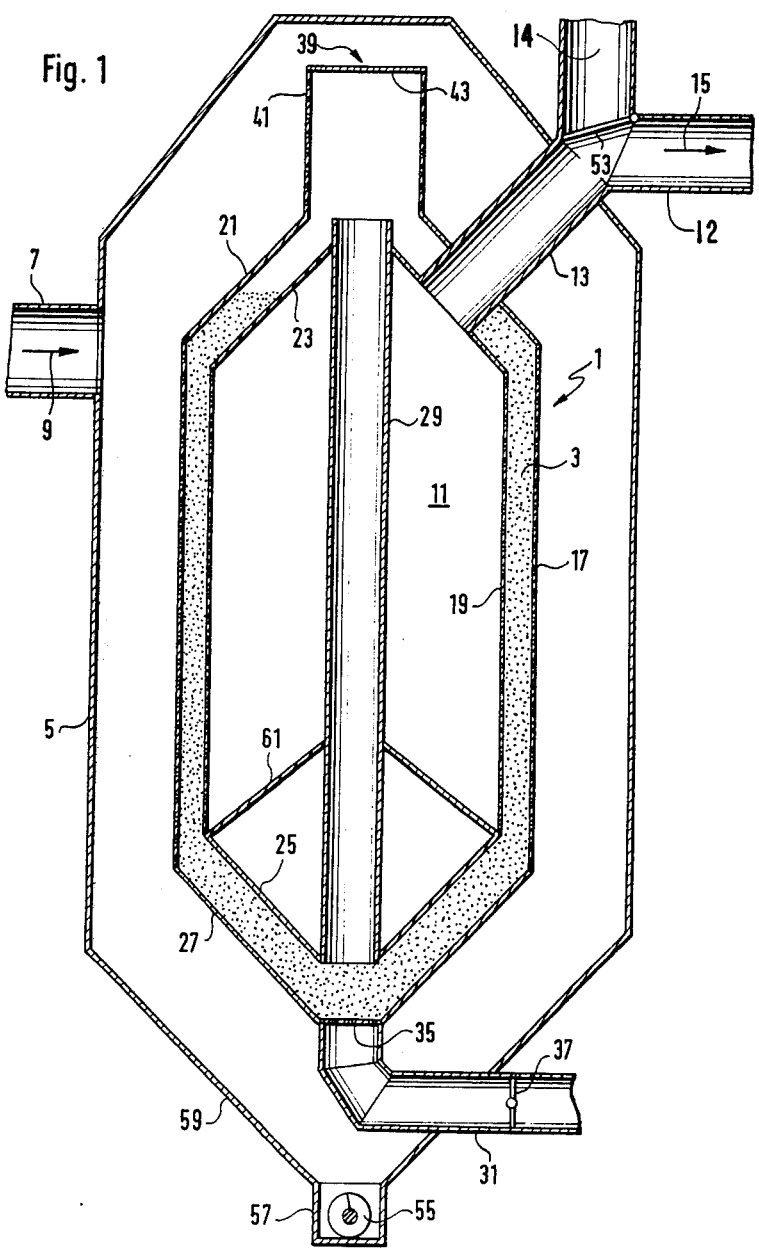

United States Patent [19]

Berz

[11] 4,142,873

[45] Mar. 6, 1979

[54] METHOD AND APPARATUS FOR CLEANING A FILTER BED

[75] Inventor: Wolfgang Berz, Westmount, Canada

[73] Assignee: Gimag Aktiengesellschaft, Chur, Switzerland

[21] Appl. No.: 793,418

[22] Filed: May 3, 1977

[30] Foreign Application Priority Data

May 6, 1976 [CH] Switzerland .................. 5706/76

[51] Int. Cl.$^2$ .............................................. B03C 3/80
[52] U.S. Cl. .......................................... 55/12; 55/96; 55/282
[58] Field of Search ............... 55/5, 12, 14, 96, 98, 55/99, 103, 114, 117, 120, 131, 282, 390, 474, 479, 516–518; 210/268, 269

[56] References Cited

U.S. PATENT DOCUMENTS

| 563,709 | 7/1896 | Case ................................. 55/474 X |
| 989,665 | 4/1911 | Tixier ............................... 210/268 X |
| 2,992,700 | 7/1961 | Silverman et al. ................ 55/103 X |
| 3,742,680 | 7/1973 | Severs .................................. 55/103 |
| 3,912,466 | 10/1975 | Zenz ....................................... 55/96 |
| 4,006,533 | 2/1977 | Squires ............................... 55/96 X |
| 4,017,278 | 4/1977 | Reese ..................................... 55/96 |
| 4,035,170 | 7/1977 | Lear, Jr. et al. ................... 55/479 X |

FOREIGN PATENT DOCUMENTS

| 101096 | 1/1899 | Fed. Rep. of Germany ........... 210/268 |
| 1507880 | 8/1973 | Fed. Rep. of Germany. |
| 2257247 | 5/1974 | Fed. Rep. of Germany. |
| 2543063 | 4/1976 | Fed. Rep. of Germany. |
| 450581 | 12/1974 | U.S.S.R. ................................ 210/268 |

OTHER PUBLICATIONS

*The Condensed Chemical Dictionary*, 8th ed. N.Y., Reinhold, 1971, pp. 290, 291,746, 783.
*Chemical Engineers' Handbook*, 4th ed. N.Y., McGraw-Hill, 1963, pp. 21–50, 21–51.

*Primary Examiner*—Frank W. Lutter
*Assistant Examiner*—Kathleen J. Prunner
*Attorney, Agent, or Firm*—Hans Berman

[57] ABSTRACT

The invention concerns the cleaning of the granulate filter bed material of a gas filter. The granulate material is contained in the spaces between two or more gas-permeable walls. The walls are designed as vertical tubes which may be cylindrical or consist of two cones with their bases together. The crude gas passes transversely through these walls from an outer chamber into an inner chamber from where it is led away as purified gas. A transfer pipe runs from the bottom of the filter bed to the top. A current of conveyor air is forced through the transfer pipe so that it carries the granulate material from the bottom to the top of the filter bed. At the top of the filter bed the conveyor air escapes through a gas-permeable hood while the granulate material falls into the space(s) between the gas-permeable walls, passes down between the walls and eventually reaches the bottom of the filter bed again. This circulation of the filter bed material by means of the conveyor gas passing through the transfer pipe can take place during a separate cleaning phase or at the same time as filtration. Provision is also made for passing blasts for scavenging air through the filter bed in the opposite direction to that of the crude gas flow in order to remove filter cake adhering to the outside surface of the outer gas-permeable wall.

3 Claims, 5 Drawing Figures

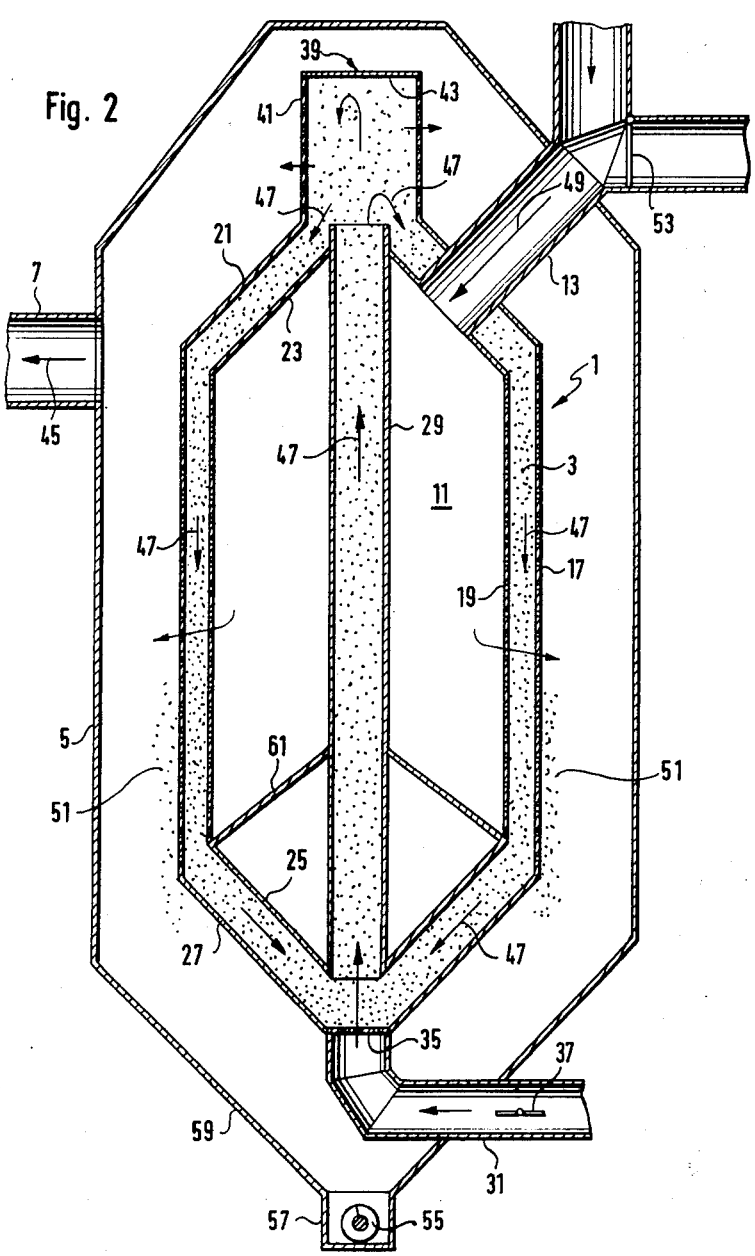

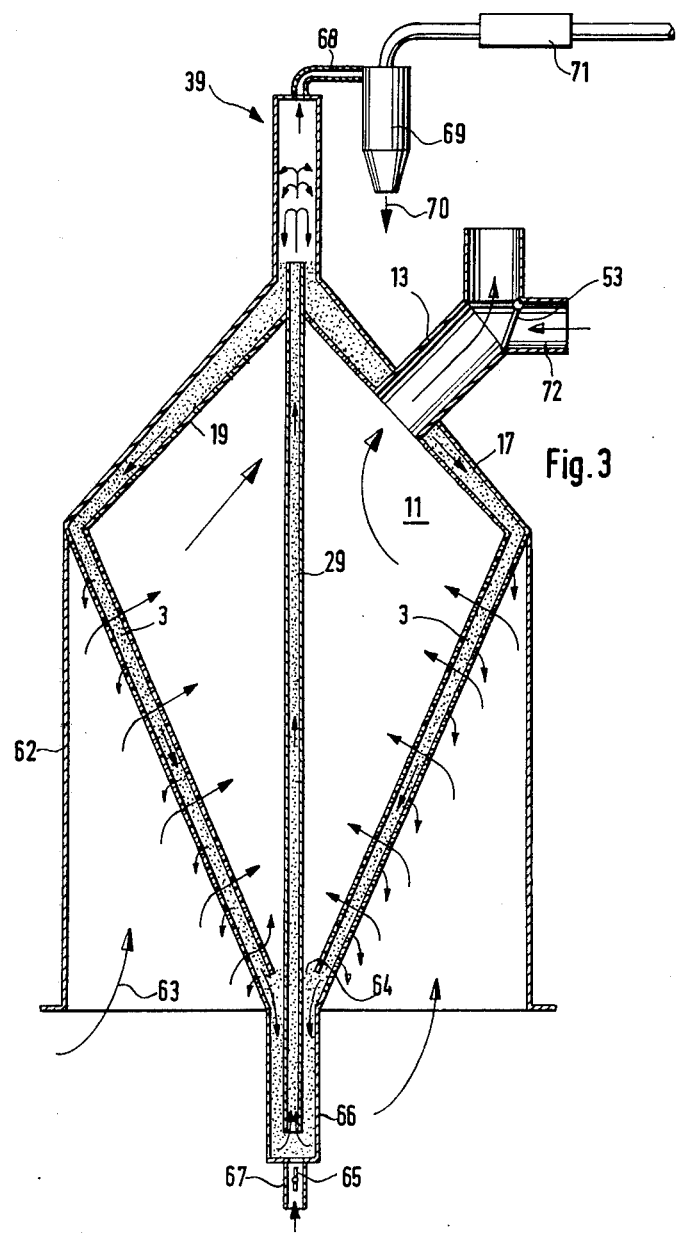

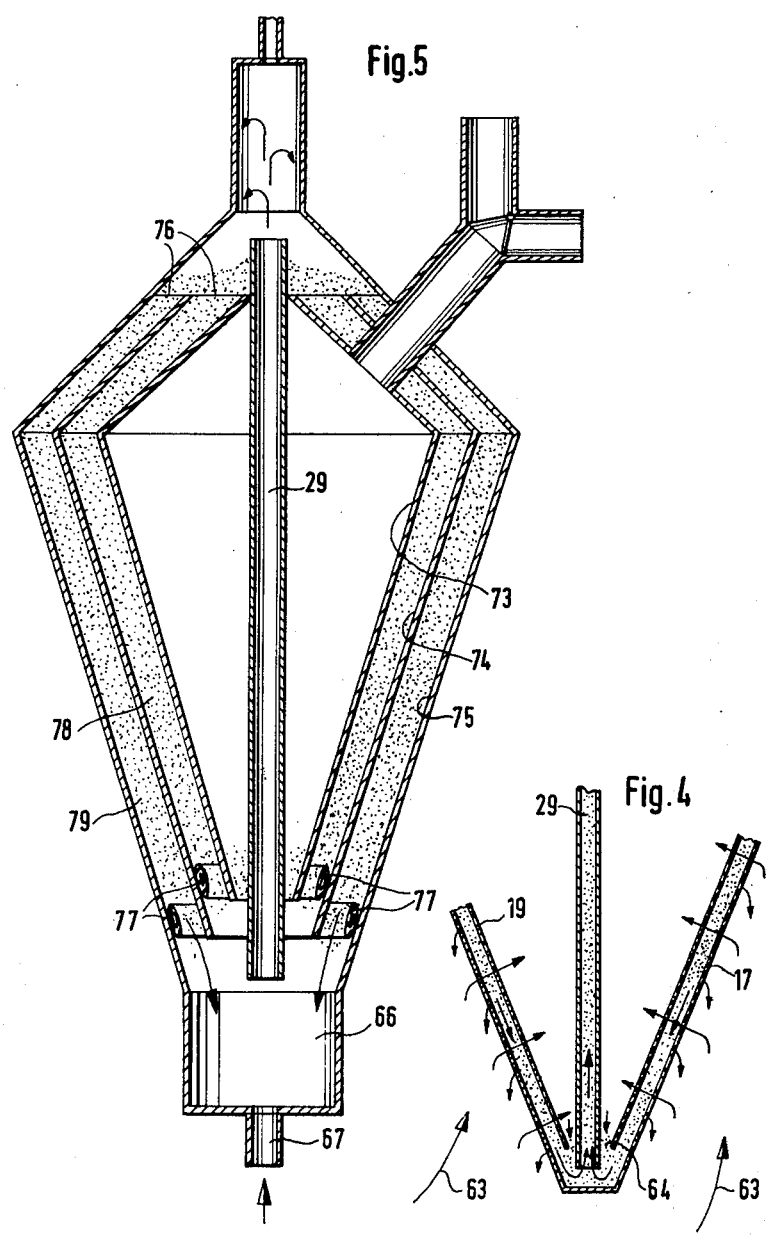

METHOD AND APPARATUS FOR CLEANING A FILTER BED

The present invention concerns a method of cleaning a filter bed of granulate material which is contained in a space between gas-permeable walls and through which crude gas containing dust or other impurities passes in a direction transverse to the gas-permeable walls.

Apparatus suitable for carrying out this kind of method is disclosed in West German Offenlegungsschrift No. 2,257,247. The filter elements consist of a stack of annular filter chambers partly filled with granulate material and arranged with their axes substantially vertical. The chamber casings above the granulate material are gas-permeable to allow the crude gas to pass in. The gas passes out of the chambers through a gas-permeable floor. To clean these filter elements, air is blown into the interior of the filter stack in the opposite direction to that in which the crude gas flows during the filtration phase, i.e. entering through the floors of the filter chambers and leaving through the gas-permeable casing walls. During this cleaning phase any filter cake adhering to the casing walls is blown off and the granulate material in the filter chambers mixed.

A disadvantage of these filter elements is that the bed depth in the filter chambers must be relatively great to prevent crude gas from penetrating through the filter. This makes a relatively high pressure difference necessary between the crude gas side and the purified gas side of the filter element. Furthermore, the area through which the crude gas can pass is large compared with the dimensions of the filter element. The necessary reinforcement of the filter element has an adverse effect on the weight of the filter element.

In addition, West German Auslegeschrift No. 1,507,880 discloses a filter in which granulate material contained between two parallel, gas-permeable walls is transported during the cleaning phase from the bottom to the top of the filter bed by compressed air flowing through a pipe. The mouth of this pipe is situated above a sieving device, over the sieving surfaces of which the granulate material falls back into the filter bed. Located beneath the sieving surfaces is a cleaning space connected by a suction line to a dust precipitator. The dust falling through the sieving surfaces is carried away through the suction line. A disadvantage of this known filter is the low efficiency of its cleaning equipment which in turn requires filters in the form of the dust precipitator.

According to West German Offenlegungsschrift No. 2,543,063 (claiming the priority of U.S. Pat. No. 4,017,278) the granulate material is placed between two concentric cylindrical walls where it travels downwards and is transported by a mechanical conveyor through an external return duct up into the filter again. The construction of this equipment is complicated and the external conveyor system is liable to breakdowns since the granulate material readily sticks together under pressure and can easily block up the conveyor ducts.

The object of the present invention is therefore to provide a method which enables the time taken to clean a filter bed of granulate material to be shortened.

This object is achieved by using the method outlined at the outset wherein the granulate material is transported at least at intervals by a stream of conveyor gas upwards within an inner chamber defined by the gas-permeable walls, the granulate material subsequently falling into the space between the gas permeable walls and finally returning between the gas-permeable walls to within the range of influence of the stream of conveyor gas.

Since during the cleaning phase the filter bed is both circulated round a closed cycle and scavenging gas is passed through the bed, cleaning times are considerably shorter compared with prior art filter bed cleaning methods. The method of the present invention thus enables the filter bed to be designed narrower in the crude gas flow direction. This significantly lowers the pressure drop across the filter bed. The short cleaning time also allows granulate material of very small grain diameter to be used.

One embodiment of the method is particularly suitable for granulate material of very small grain diameter. In this embodiment, the granulate material is taken from the bottom of the filter bed and blown to the top through a transfer pipe. The granulate material may be circulated in this way even with a low-power blower producing a gauge pressure of 0.1 atm. for instance.

It has also been found to be worth charging the granulate material electrically in the transfer tube. The charged granulate material passed back into the filter bed then attracts dust and the like from the crude gas, thus reinforcing the action of the filter element.

A further object of the invention is to provide apparatus for carrying out the above method with a filter bed of granulate material in a filter for purifying crude gas containing dust or other impurities. The apparatus comprises spaced apart, gas-permeable walls between which the filter bed is contained, the gas-permeable walls being designed as tubes with substantially vertical axes and disposed one inside the other, the apparatus further comprising a transfer pipe which is disposed within the inner of the tubes and through which a stream of conveyor gas can be passed thereby to transfer the granulate material from the bottom to the top of the filter bed and into the open end of the filter bed space between the inner and an adjacent tube.

A filter element like this forms one constructional unit which, despite its very simple construction, is mechanically so stable that it can be replaced as one unit. In particular, the transfer tube can be used to support the caps. The gas-permeable tubes may be designed as gratings and do not have to be inherently rigid. The gas-permeable tubes may however in some applications be strengthened by reinforcing elements.

Owing to the particularly short filter bed cleaning time, the crude gas throughput during the filtration phase can be increased compared with prior art filters without increasing the volume of granulate material. In addition, granulate material, in particular sand, of small grain diameter may be used, preferably 0.1 to 1 mm, thus increasing the effective filtering surface.

The distance between the gas-permeable tubes is preferably about 1 to 5% of the tube diameter, thus giving very low values for the pressure drop across the filter bed.

The cavity between the caps is filled with granulate material to a height such that the interior of the filter element is sealed off from the crude gas surrounding the filter element.

The filter element may be fitted in the outer or crude gas chamber of a filter singly or together with further filter elements of the same kind and linked together by one or more ducts leading out of the interior of the filter element. During the filtration phase the crude gas is passed through the gas-permeable walls of the tubes into the interior of the filter element and the purified gas led away through the duct leading out of the interior of the filter element. During the cleaning phase, scavenging gas is blown into the interior of the filter element through the same duct which may be provided with a flap to shut it off from the purified gas take-off line. The scavenging gas dislodges any filter cake deposited on the outside of the outer gas-permeable tube. The expansion of the filter elements when the scavenging gas is blown in helps to remove the filter cake. Detached filter cake falls down to the floor of the outer chamber where it is collected and removed by e.g. a screw conveyor.

The scavenging process can be intensified by supplying the scavenging gas in blasts so that during cleaning the filter tubes frequently expand and then contract again.

During the cleaning phase conveyor gas, e.g. air at 0.1 atm. gauge pressure is blown into the transfer pipe. Granulate material is thus sucked into the transfer pipe from the bottom of the filter bed, travelling through the transfer pipe in a dilute stream to the top of the filter bed. Gravity then pulls the granulate material downwards between the gas-permeable walls. The filter bed is thus circulated in a closed cycle, moving across the path of the scavenging gas.

The caps at the end of the gas-permeable tubes preferably taper conically outwards, the transfer pipe terminating in the apices of the inner caps. The conical shape of the caps prevents the granulate material from forming blockages. It has been found to be of practical advantage if the angle of inclination of the conical surfaces to the horizontal is equal to or greater than the angle of repose of the granulate material.

So that the conveyor gas can be led in and out, the apices of the outer caps are preferably formed by gas-permeable wall elements. The gas-permeable wall element of the lower outer cap is preferably disposed opposite the mouth of the transfer pipe and is surrounded by a conveyor gas supply duct. The gas-permeable wall element of the upper outer cap is conveniently designed as a tubular hood located coaxial with the transfer pipe and having a gas-permeable wall closed over at its end remote from the transfer pipe by a gas-impermeable panel. The conveyor gas flow rate drops in the hood and the granulate material is slowed down by the hood roof panel. The conveyor gas escapes through the gas-permeable wall of the hood into the outer chamber.

The purified gas take-off and/or scavenging gas input duct conveniently terminates in the region of the caps in the interior of the filter element. It can be mounted here without any problems. It is of additional advantage if the scavenging gas input duct leads into the interior of the filter element in the region of the upper cap as long as a floor sloping downwards from the inner gas-permeable tube is mounted between the lower edge of the gas-permeable tube and the transfer pipe. This ensures that any dust or the like which gets into the interior of the filter element is moved outwards down the slope of the conical floor during the scavenging operation, reaching the outer chamber through the circulating filter bed.

Illustrative embodiments of the present invention are described below in conjunction with the accompanying drawings.

FIG. 1 shows a crude gas filter incorporating a filter element according to the invention during the filtration phase, FIG. 2 shows the filter element of FIG. 1 during the cleaning phase, FIGS. 3–5 show further embodiments in section.

FIG. 1 shows schematically a filter in operation. The filter element 1 has a filter bed 3 of granulate or granular material and is located within an outer chamber 5. Dust-containing or otherwise impure crude gas is fed through a supply pipe 7 into the outer chamber 5 as indicated by arrow 9. The crude gas passes through the filter bed 3 into an inner chamber 11 formed by the inside walls of the filter element 1. The purified gas is withdrawn from the inner chamber 11 through a duct 13 and a take-off pipe 12 as shown by arrow 15.

The filter bed 3 is held in the annular space between the gas-permeable walls of two tubes 17, 19 arranged one inside the other. The ends of the tubes 17, 19 are closed off by outwardly tapering gas-impermeable conical caps 21, 23, 25, 27. The caps 21/23 and 25/27 at the same end of the filter element are spaced apart and the granulate material extends far enough into the cavities thus formed to seal off the inner chamber 11 from the outer chamber 5.

Running through the filter element and coaxial with the tubes 17, 19 is a pipe 29 which opens out into the spaces between the caps at the apices of the inner caps 23 and 25. As is shown in FIG. 2, granulate material is withdrawn from the bottom and transferred to the top of the filter bed 3 through this transfer pipe 29 during the filter cleaning phase. The transfer pipe 29 thus acts as a dilute stream conveyor, a stream of suspending and conveying air being fed through the transfer pipe 29 from a supply line 31 joined to the outer lower cap 27 opposite the lower mouth of pipe 29. The supply line 31 is separated from the filter bed 3 by a gas-permeable wall element 35 such as a grating which prevents the granulate material from entering the supply line 31. Positioned in the path of the air stream is a valve 37, e.g. a flap, which is closed during the filtration phase (FIG. 1) but open during the cleaning phase. Mounted coaxial with the transfer pipe 29 on the outer upper cap 21 is a hood 39 the side wall of which is a gas-permeable wall element 41 such as a grating. The zone in the hood 39 furthest from the transfer pipe 29 is closed by a gas-impermeable panel 43. The air blown upwards through the transfer pipe 29 is withdrawn from the hood 39 through the gas-permeable wall element 41 and escapes in the direction shown by arrow 45 through pipe 7 or an additional pipe connected to the outer chamber 5. The granulate filter bed material carried up with the air is however retained by the gas-permeable wall element 41 and falls into the space between the upper caps 21, 23. The filter bed 3 is thus circulated in the direction of arrows 47 during the cleaning phase.

At the same time scavenging air is blown into the inner chamber 11 through duct 13 and a duct 14 in the direction of arrow 49. The scavenging air detaches from the outer surface of the outer tube 17 any filter cake of particular impurities adhering to the surface. A flap 53 closes duct 13 off from the purified gas take-off pipe 12 during the cleaning phase. During the filtration phase (FIG. 1) duct 13 is closed with respect to the scavenging air supply duct 14. Any filter cake 51 dislodged from the outer surface of tube 17 falls down and collects in a channel 57 beneath a conical collector 59 from where it is removed by a suitable device such as a screw conveyor 55. Located between lower end of the inner tube 19 and the transfer pipe 29 is a conical floor 61 sloping downwards from transfer pipe 29. Any dust or the like which has penetrated into the inner chamber 11 and collected on this floor is conveyed by the scavenging air through the filter bed 3 into the outer chamber 5.

Since during the cleaning phase air both circulates and flows through the filter bed 3, cleaning times are particularly short. It is therefore possible to use granulate material of very small grain size, e.g. 0.5 to 1 mm. Sand is the preferred granulate material. The width of the filter bed 3 in the crude gas flow direction is very small, e.g. 10 to 15 mm. Transfer pipe 29 running through the inner chamber 11 reinforces the filter element 1 so that they can be replaced together as a single component.

The filter element 1 is preferably cylindrical. Its diameter may be 10 cm to 1 m. The diameter and length of the tubes 17, 19 are chosen to suit the desired crude gas throughput. FIGS. 1 and 2 show a filter with only one filter element 1. If required, however, the outer chamber 5 may contain several filter elements. The transfer pipe 29 can also be made of electrically insulating material such as a plastic. The filter bed granules blown through the transfer pipe 29 during the cleaning phase become electrically charged by frictional contact with the transfer pipe 29, thus enhancing their ability to trap dust particles. When the granular material is quartz gravel, at least the inner surface of the pipe 29 is made of hard rubber.

During the cleaning phase, the scavenging air can be passed into the inner chamber 11 in a continuous stream. The scavenging process can however be intensified by supplying the scavenging air in blasts. The tubes 17, 19 are preferably made of wire meshing and are shaken or set in vibration by the pulses of scavenging air so that any foreign bodies adhering to the outer surface of tube 17 are detached.

Supplying the scavenging air in blasts gives an additional advantage however. Continuous operation can give rise to a situation in which the granulate material is carried up through the transfer pipe 29 and deposited as a relatively loose bed between the two tubes 17 and 19. Hence in normal operating conditions faults can occur, particularly on starting up, since the gas to be filtered favours the loosely packed areas of lower resistance. Not only does this lead to incomplete gas purification but also to cavity formation and cave-ins in the filter bed. As is well known to those in the art, the filter bed material should in fact remain static during operation. The problem outlined above can however be completely overcome by supplying the scavenging air in blasts. This causes the granulate material to vibrate and settle down snugly within the filter element. Even better results are obtained if the blasts of scavenging air are continued for a while, e.g. ½ to 2 minutes, at the end of the cleaning phase after discontinuing the circulation of the granular material.

Although the caps 21/23 and 25/27 are gas-impermeable in the preferred embodiment of the invention, this is not absolutely necessary. The lower caps 25/27 could be made of a gas-permeable material, particularly as the conical floor 61 seals off the inner chamber 11 from the outer chamber 5 at this end of the tubes 17, 19. If all or parts of the upper caps 21/23 are gas-permeable, care must be taken that the granulate material fills the spaces behind the gas-permeable parts.

A further embodiment of the filter of the invention is shown in FIG. 3 in which parts already mentioned are denoted by the same reference numerals as in FIGS. 1 and 2. In this embodiment, too, the filter has an inner tube 19 and an outer tube 17. The transfer pipe 29 is again concentric with the two tubes 17 and 19 and terminates under a hood 39. Each of the two tubes is however made up of two cone-shaped sections with their bases placed together, a cylindrical or polygonal casing 62 extending down from the circular joint between the two sections of the outer tube 17. The lower section of the inner tube 19 does not extend right down to the transfer pipe 29, leaving a gap 64. The lower end of the transfer pipe 29 projects into a chamber 66 in which an air supply line 67 with a valve 65 terminates.

In this embodiment, the air stream circulates the filter bed by sucking the granulate material from between the tubes 17 and 19 through chamber 66 into the transfer pipe 29 and carrying it up into the hood 39 where it falls down between the tubes 17 and 19 again. The dustladen conveyor air passes from the hood 39 through a duct 68 into a precipitator 69 where the already partly aggregated dust particles are precipitated in the direction of arrow 70.

Any dust particles still adhering to the granulate material fall inwards into the inner chamber 11 as the granulate material passes down between the upper sections of tube 17 and 19, but is retained in the filter bed as the granulate passes down between the lower sections of the tubes owing to the inwards-flowing crude gas. The dust which falls into the inner chamber 11 is sucked downwards through the gap 64, which is filled with granulate material, and travels further with the granulate material.

The air supply line 67 could be replaced by a suction device 71 positioned on the side of the dust precipitator 69 remote from the filter. Purified gas would be sucked out of the inner chamber 11 through the gap 64 and into the transfer pipe 29, carrying the granulate material with it. The lower part of the filter could in this case be designed as shown in FIG. 4.

In the embodiment of FIG. 3, therefore, the cleaning and filtration phases progress simultaneously, i.e. the granulate material is circulated continuously. The crude gas flows in under the casing in the direction indicated by arrow 63, passes through the filter bed 3 and finally emerges from the filter as purified gas through duct 13.

To enable the filter to be scavenged occasionally a scavenging air pipe 72 fitted with a shut-off device 53 may be connected to duct 13. The scavenging air pipe 72 is not however necessary in small crude gas filters.

The cleaning of the granulate material as it passes down between the tubes 17 and 19 is of course further improved by decreasing the angle of the conical tubes, i.e. by increasing the gravitational component acting on the granules. The dust precipitator 69 is preferably a cyclone precipitator.

The degree of purification of the gas is even further improved in the embodiment of FIG. 5. This embodiment includes three tubes 73, 74, 75 similar in shape to the tubes 17, 19 in FIG. 3 and defining therebetween annular chambers 78, 79 having open upper ends 76 and filled with granular filtering material. Located in the lower conical sections of the chambers 78, 79 are shut-off members 77 which enable either of the chambers 78 and 79 to be closed off or opened up as required. While the granulate material is passing down through chamber 78 into chamber 66, it can be stationary in chamber 79, thus ensuring that the crude gas is filtered thoroughly. After operating for a certain time like this, the procedure is reversed so that chamber 78 is closed off and chamber 79 opened up. The shut-off members 77 may be inflatable annular tubes for instance. The perforations of the tubes 73, 74, 75 and other features common to the apparatus of FIG. 3 and FIG. 5 have been omitted from FIG. 5.

What is claimed is:

1. A method of purifying a gas of solid suspended particles which comprises:
    (a) passing the gas to be purified sequentially through a first vertically extending wall substantially permeable to said particles, and through a filter bed of granular material less permeable to said particles than said first wall and retaining said particles, whereby said gas is purified, and passing the purified gas through a second, vertically extending wall during each of a plurality of filtration phases,
        (1) said walls and said filter bed being permeable to said gas, and
        (2) said granular material being confined in a space bounded by said walls, said space having top and bottom portions;
    (b) withdrawing the purified gas from said second wall during each filtration phase;
    (c) withdrawing the granular material from said bottom portion during each of a plurality of filter bed cleaning phases alternating with said filtration phases by suspending the granular material in a stream of conveying gaseous material flowing toward a zone above said top portion during each cleaning phase;
    (d) separating the suspended granular material in said zone from said stream during each cleaning phase;
    (e) withdrawing said gaseous conveying material from said zone separately from said granular material while permitting said granular material to move downward into said top portion during each cleaning phase; and
    (f) passing scavenging gas sequentially through said second wall, said filter bed, and said first wall during each cleaning phase.

2. The method of claim 1, wherein said scavenging gas is passed through said walls and said filter bed in sequential pulses.

3. The method of claim 1, wherein said granular material is being charged electrically while suspended in said stream.

* * * * *